(12) United States Patent
Fukui et al.

(10) Patent No.: US 9,325,192 B2
(45) Date of Patent: Apr. 26, 2016

(54) BATTERY CHARGING MANAGEMENT SYSTEM FOR AUTOMATED GUIDED VEHICLE AND BATTERY CHARGING MANAGEMENT METHOD FOR AUTOMATED GUIDED VEHICLE

(71) Applicant: NISSAN MOTOR CO., LTD., Yokohama-shi, Kanagawa (JP)

(72) Inventors: Toshihito Fukui, Machida (JP); Mitsuru Hirayama, Isehara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/418,163

(22) PCT Filed: Jul. 31, 2013

(86) PCT No.: PCT/JP2013/070744
§ 371 (c)(1),
(2) Date: Jan. 29, 2015

(87) PCT Pub. No.: WO2014/021381
PCT Pub. Date: Feb. 6, 2014

(65) Prior Publication Data
US 2015/0263541 A1  Sep. 17, 2015

(30) Foreign Application Priority Data

Aug. 2, 2012 (JP) ................................. 2012-171716

(51) Int. Cl.
| | |
|---|---|
| H02J 7/00 | (2006.01) |
| B60L 11/00 | (2006.01) |
| G05D 1/00 | (2006.01) |
| B60L 11/18 | (2006.01) |
| G05D 1/02 | (2006.01) |
| B60L 3/00 | (2006.01) |
| H02J 7/04 | (2006.01) |

(52) U.S. Cl.
CPC ............... *H02J 7/007* (2013.01); *B60L 3/0046* (2013.01); *B60L 11/18* (2013.01); *B60L 11/185* (2013.01);
(Continued)

(58) Field of Classification Search
CPC ... H02J 7/007; B60L 11/1816; B60L 11/1861
USPC ..................... 320/134, 109; 701/22
See application file for complete search history.

(56) References Cited

U.S. PATENT DOCUMENTS

| | | | | |
|---|---|---|---|---|
| 5,200,689 A | * | 4/1993 | Interiano | ............ G01R 31/3624 320/149 |
| 5,545,967 A | * | 8/1996 | Osborne | ................... B60S 5/06 104/34 |

(Continued)

FOREIGN PATENT DOCUMENTS

| | | |
|---|---|---|
| JP | 03-279883 A | 12/1991 |
| JP | 2007-074800 A | 3/2007 |
| JP | 2012-075268 A | 4/2012 |

*Primary Examiner* — M'Baye Diao
(74) *Attorney, Agent, or Firm* — Foley & Lardner LLP

(57) ABSTRACT

A battery charging management system for an automated guided vehicle that travels in an unpiloted manner by using a battery as a driving power source and performs a charging operation for the battery using a battery charger provided in a charging station, comprises a charge/discharge monitoring part that monitors a charge/discharge amount of the battery, a charging needlessness threshold voltage setting part that sets a charging needlessness threshold voltage for the battery, and a charging control part that performs the charging operation for the battery using the battery charger when it is determined that a voltage of the battery of the automated guided vehicle arriving at the charging station is lower than the charging needlessness threshold voltage set by the charging needlessness threshold voltage setting part. The charging needlessness threshold voltage setting part is configured to lower the charging needlessness threshold voltage during a particularly set time period.

5 Claims, 7 Drawing Sheets

(52) U.S. Cl.
CPC ......... *B60L 11/1816* (2013.01); *B60L 11/1846* (2013.01); *B60L 11/1859* (2013.01); *B60L 11/1861* (2013.01); *G05D 1/02* (2013.01); *H02J 7/00* (2013.01); *H02J 7/0004* (2013.01); *H02J 7/0027* (2013.01); *H02J 7/045* (2013.01); *B60L 2200/44* (2013.01); *B60L 2240/545* (2013.01); *B60L 2240/547* (2013.01); *B60L 2240/549* (2013.01); *B60L 2240/80* (2013.01); *B60L 2250/16* (2013.01); *B60L 2260/32* (2013.01); *G05B 2219/31004* (2013.01); *H02J 2007/004* (2013.01); *H02J 2007/0037* (2013.01); *Y02T 10/705* (2013.01); *Y02T 10/7005* (2013.01); *Y02T 90/121* (2013.01); *Y02T 90/128* (2013.01); *Y02T 90/14* (2013.01); *Y02T 90/169* (2013.01); *Y04S 30/14* (2013.01)

(56) References Cited

U.S. PATENT DOCUMENTS

| | | | |
|---|---|---|---|
| 6,435,313 B2 * | 8/2002 | Tajima | B66B 1/30 187/290 |
| 6,847,127 B1 * | 1/2005 | Lee | B60L 11/1861 290/40 C |
| 7,821,306 B2 * | 10/2010 | Tagome | H03K 17/04123 327/108 |
| 7,888,911 B2 * | 2/2011 | Wong | B60L 11/185 320/132 |
| 7,928,735 B2 * | 4/2011 | Huang | B60L 11/1857 320/132 |
| 8,305,038 B2 * | 11/2012 | Maruyama | H01M 10/425 320/118 |
| 8,410,755 B2 * | 4/2013 | Chau | B60L 3/0046 320/118 |
| 8,890,483 B2 * | 11/2014 | Nakatsuji | H01M 2/34 320/134 |
| 2012/0169290 A1 * | 7/2012 | Nakashima | H01M 10/44 320/134 |
| 2012/0207620 A1 * | 8/2012 | Dalum | B60K 6/12 417/44.1 |
| 2013/0176401 A1 * | 7/2013 | Monari | H04N 5/2252 348/47 |
| 2014/0239912 A1 * | 8/2014 | Hanada | H02J 7/00 320/134 |

* cited by examiner

BATTERY CHARGING MANAGEMENT SYSTEM FOR AUTOMATED GUIDED VEHICLE AND BATTERY CHARGING MANAGEMENT METHOD FOR AUTOMATED GUIDED VEHICLE

FIELD OF THE INVENTION

This invention relates to a battery charging management system and a battery charging management method of an automated guided vehicle that travels in an unpiloted manner by using electric power of a mounted battery as a driving power source and charges the battery in a charging station.

BACKGROUND OF THE INVENTION

JP 2007-74800A, published by the Japan Paten Office in 2007, proposes a charging control device of an automated guided vehicle having a nickel-hydrogen battery or a lithium-ion battery that can be used in a partial charge/discharge mode as a battery, and a charging control part that starts charging when a remaining amount of the battery reaches a charging start amount, and stops charging when the remaining amount reaches a charging stop amount.

In an assembly production line, for example, plural automated guided vehicles that travel along a travel route of a determined orbiting track are generally employed. Each vehicle loads assembly components in a picking station, transport them to an assembly station, and unloads them in the assembly station, and then returns to the picking station again. Plural automated guided vehicles are operated in series so as to circulate between the picking station and the assembly station to sequentially supply the assembly components necessary in the assembly station. In plural automated guided vehicles operated in series in this manner, it is necessary to charge the battery using an automatic charger of the charging station whenever the remaining amount of the mounted battery decreases to a predetermined charge start amount, as described in the prior art. For this reason, the automatic charger of the charging station is configured to continuously receive electric power and periodically perform the charging operation for each automated guided vehicle to be charged. As a result, in order to charge the automated guided vehicles, it is necessary to ceaselessly supply electric power to the automatic charger of the charging station to maintain a certain amount of electric power. Accordingly, it is difficult to suppress power consumption at a particular predetermined time.

SUMMARY OF THE INVENTION

In view of the aforementioned problems, it is therefore an object of this invention to provide a battery charging management system and a battery charging management method for an automated guided vehicle suitable for suppressing electric power supplied to the battery charger at a particular predetermined time.

According to an aspect of this invention, a battery charging management system is provided for an automated guided vehicle that travels in an unpiloted manner by using a battery as a driving power source and performs a charging operation using a battery charger. The battery charging management system comprises a charge/discharge monitoring part that monitors a charge/discharge amount of the battery, and a charging needlessness threshold voltage setting part that sets a charging needlessness threshold voltage for the battery. The battery charging management system further comprises a charging control part that performs the charging operation for the battery using the battery charger when it is determined that a voltage of the battery of the automated guided vehicle arriving at the charging station is lower than the charging needlessness threshold voltage set by the charging needlessness threshold voltage setting part. The charging needlessness threshold voltage setting part is configured to lower the set charging needlessness threshold voltage during a particularly set time period.

The details as well as other features and advantages of this invention are set forth in the remainder of the specification and are shown in the accompanying drawings.

DESCRIPTION OF THE PREFERRED EMBODIMENTS

A battery charging management system for an automated guided vehicle according an embodiment of this invention will be described.

Figure 1:
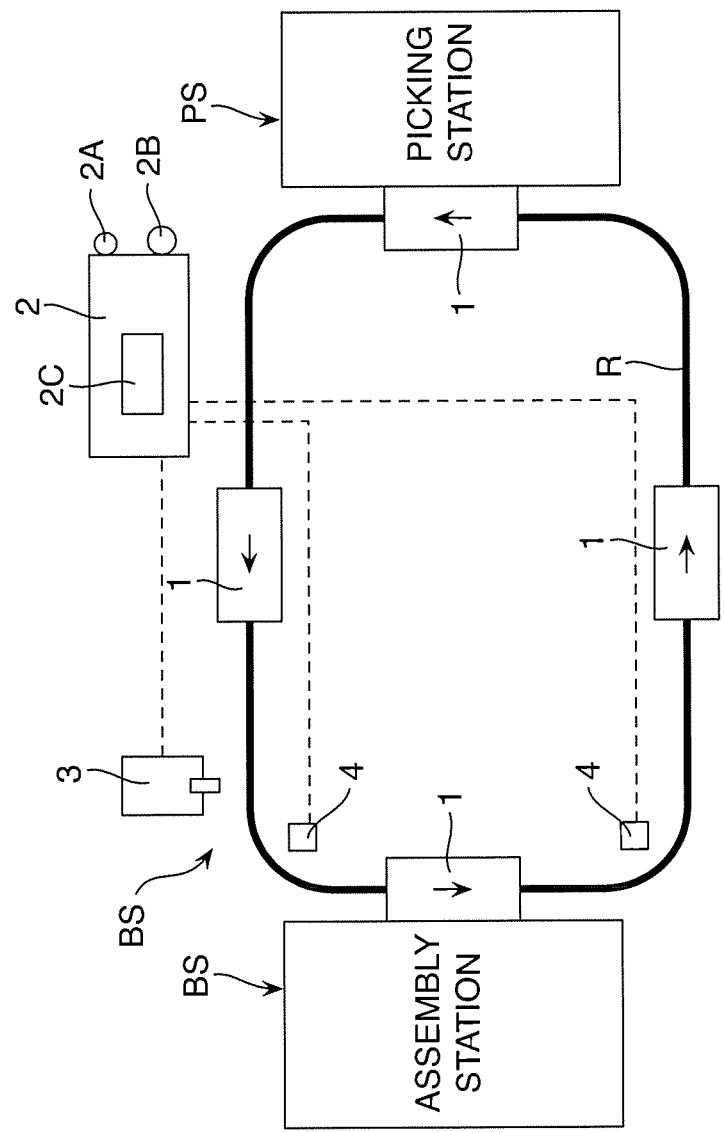
FIG. 1 is a schematic diagram illustrating an exemplary travel route of an automated guided vehicle according to an embodiment of this invention.

A travel route of a delivery process used by the automated guided vehicle 1 comprises, for example, a travel route R of an orbiting track set to pass through a picking station PS and an assembly station BS of an assembly production line as illustrated in FIG. 1. In the delivery process, plural automated guided vehicles 1 are configured to travel along this travel route R, and an equipment-side control device 2 controls the travel of each automated guided vehicle 1.

Components used in the assembly station BS are loaded on each automated guided vehicle 1 in the picking station PS, and each automated guided vehicle 1 travels along the travel route R to deliver the components to the assembly station BS. In the assembly station BS, the components are unloaded, and each automated guided vehicle 1 travels along the travel route R again to return to the picking station PS, so that this circulation travel is repeated. A charging station CS having an automatic charger 3 controlled by the equipment-side control device 2 is arranged, for example, near the assembly station BS on the travel route R. In addition, a fixed station 4 that transmits/receives signals to/from the automated guided vehicle 1 and the equipment-side control device 2 is provided, for example, in the entrance and the exit of the assembly station BS.

Figure 2:
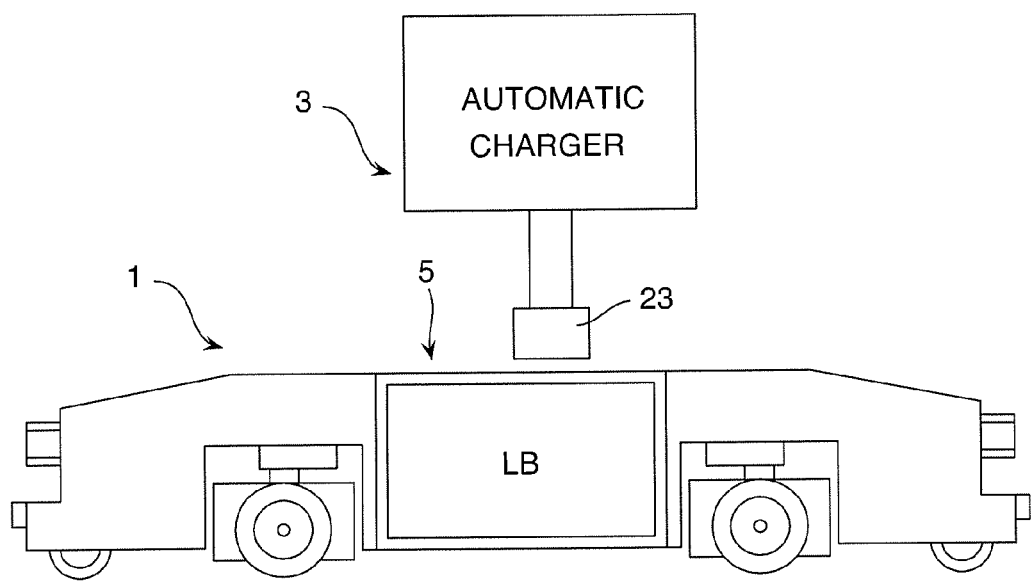
FIG. 2 is a schematic side view of the automated guided vehicle and an automatic battery charger of a charging station.
Figure 3:
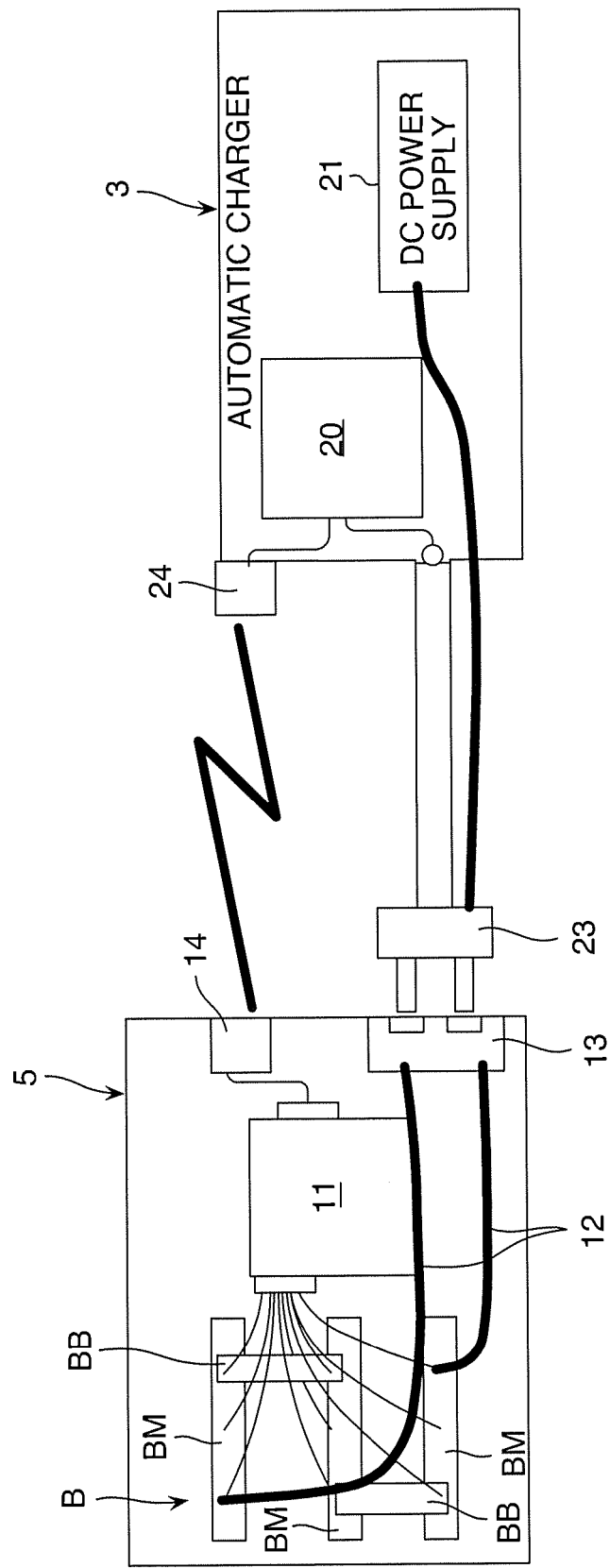
FIG. 3 is a schematic diagram illustrating a connection between a battery of the automated guided vehicle and the battery charger of the charging station during a charging operation.

Referring to FIGS. 2 and 3, each automated guided vehicle 1 is provided with a battery box 5 that is mounted, for example, in the center of a vehicle body and houses a battery LB formed from a secondary battery (e.g., lithium-ion secondary battery) and a charge/discharge monitor 11 that monitors a condition of the battery LB. The automated guided vehicle 1 travels by using the battery LB as a driving power source. The battery LB is constituted by plural battery modules BM (e.g., three as in the illustrated in FIG. 3) connected in series using a busbar BB. Each battery module BM having a charging state voltage of approximately 8 V is constituted by plural lithium-ion unit cells connected in parallel or in series. For this reason, an output voltage of the battery LB becomes approximately 25 V when the battery LB is fully charged. Accordingly, the overcharge voltage of the battery LB is set to, for example, 25 V, and the over-discharge voltage is set to, for example, 18 V. A voltage for determining necessity and needlessness of the charging operation is set to a value between the overcharge voltage and the over-discharge voltage, and, for example, at 24.9 V. The charging operation is required when the battery voltage is lower than this voltage. The charging operation is not required when the battery voltage is higher than this voltage. In this manner, it is possible to prevent the battery voltage from reaching the over-discharge voltage where the battery LB starts to be deteriorated and protect the battery by setting a voltage difference between the over-discharge voltage and the voltage for determining the charging start or the charging completion to a sufficiently large value.

A receiving contactor 13 exposed to the outer surface of the battery box 5 is connected to an end of the feeding line 12 of the battery LB. A feeding contactor 23 extendable/contractible to/from the automatic charger 3 of the charging station CS is connected to the receiving contactor 13, so that the battery LB can be charged.

A charging state of the battery LB formed from a lithium-ion battery is monitored/computed by the charge/discharge monitor 11 as illustrated in FIG. 3. The charge/discharge monitor 11 is operated to monitor and store a charge/discharge amount of the battery LB (battery voltage), a cell voltage, a current amount (ampere-hour, AH) of the input/output of the battery LB, a history of failure of the battery LB, and the like at every predetermined time interval (e.g., 10 msec). The charge/discharge monitor 11 can transmit such information to the equipment-side control device 2 via the fixed station 4 and the automatic charger 3 using a communication part 14 (e.g., optical communication).

When a voltage of any cell of the battery LB has an over-discharge state equal to or lower than a shutdown threshold value (for example, 2.8 to 3 V), the charge/discharge monitor 11 is operated to display a fact that the battery LB has a failure state and shut down (abnormally stop) the automated guided vehicle 1. A setting value of the shutdown threshold value may be changed and is typically set to, for example, 3.0 V. However, the shutdown threshold value is set to a lower setting value (for example, 2.8 V) during a vehicle passes through the assembly station BS of the travel route R to suppress a shutdown operation inside the area of the assembly station BS. Specifically, the automated guided vehicle 1 changes the setting value from 3.0 V to 2.8 V as a shutdown prohibition command is received from the fixed station 4 provided in the entrance of the assembly station BS on the travel route R using the communication part. In addition, the automated guided vehicle 1 changes the setting value from 2.8 V to 3.0 V as a shutdown prohibition release command is received from the fixed station 4 provided in the exit of the assembly station BS on the travel route R using the communication part.

The automatic charger 3 provided in the charging station CS comprises a DC power supply 21 that can boost a voltage to an upper limitation voltage (e.g., 25 V) of the battery LB, a charging control part 20 that controls the charging current value and the charging voltage value supplied to the battery LB from the DC power supply 21, and a communication part 24 that can communicate with the communication part 14 of the automated guided vehicle 1.

The communication part 24 can communicate with the communication part 14 of the automated guided vehicle 1 to obtain a charge/discharge amount (voltage) of the battery LB, a current amount (ampere-hour, AH) of the input/output of the battery LB, a history of failure of the battery LB, other instruction signals, and the like.

The automated guided vehicle 1 travels by using the battery LB as a driving power source. The voltage decreases by discharging of the battery LB as the vehicle travels. For this reason, the automated guided vehicle 1 temporarily stops when it passes through the charging station CS, and checks the charge/discharge amount of the battery LB of the automated guided vehicle 1 using the communication parts 14 and 24 between the automated guided vehicle 1 and the automatic charger 3 of the charging station CS. In the charging station CS side, it is determined whether or not the voltage of the battery LB at that time is necessary to be charged (i.e., whether or not the voltage is lower than the charging needlessness threshold voltage). If it is determined that the charging is necessary, the charging operation is performed by connecting the automatic charger 3 to the battery LB of the automated guided vehicle 1.

The charging needlessness threshold voltage is set to, for example, 24.9 V as described above. That is, it is determined that the charging is required when the battery voltage is lower than the charging needlessness threshold voltage. Otherwise, it is determined that the charging is not required when the battery voltage is higher than the charging needlessness threshold voltage. In this manner, the battery LB is protected such that the battery LB is prevented from reaching the over-discharge voltage by setting a voltage difference between the over-discharge voltage and the charging needlessness threshold voltage below which the charging is required to a sufficiently large value.

During the charging operation, as the feeding contactor 23 and the receiving contactor 13 are connected to each other by extending the feeding contactor 23 to the receiving contactor 13 of the automated guided vehicle 1. By confirming this connection state, it is determined that a chargeable condition is established. The charging electric power is thereafter supplied from the DC power supply 21 to the automatic charger 3.

The charging control part 20 executes both a constant-current/constant-voltage type normal charging mode and a constant-current/constant-voltage type fast charging mode in which a larger charging current than that of the normal charging mode is supplied to the battery LB in order to charge the battery LB. The fast charging mode is suitable for a delivery process where a short-time charging operation is necessary. In the constant-current/constant-voltage type charging mode, a constant current charging operation (hereinafter referred to as CC charging) is performed in an initial stage of the charging operation, in which a constant charging current is supplied. After the battery voltage increases to the upper limitation of the charging voltage (for example, 25 V) through the charging operation, a constant voltage charging operation (hereinafter referred to as CV charging) in which a voltage is constant is performed until a predetermined time elapses.

Figure 4:
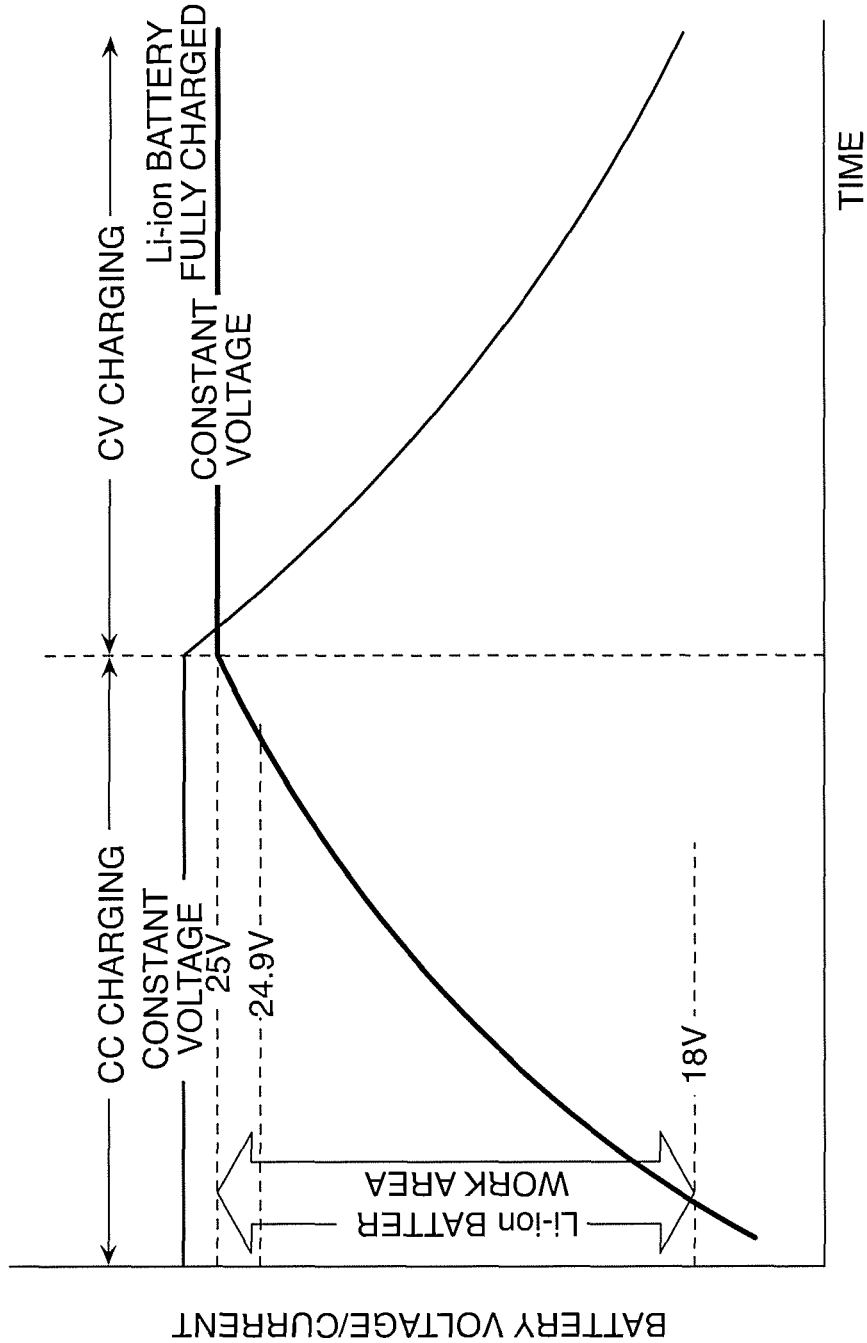
FIG. 4 is a diagram illustrating a change of a battery voltage with respect to a change of the supplied charging current during the charging operation of the battery.

FIG. 4 illustrates a change of the battery voltage during the charging operation and a change of the supplied charging current. As the battery voltage is boosted gradually and increases to the upper limitation of the charging voltage (for example, 25 V) through the CC charging operation, the CV charging operation is executed by setting a constant voltage until a predetermined time elapses while the charging current is lowered from that timing. As the predetermined time elapses, the charging control part 20 interrupts the charging operation by deactivating the DC power supply 21.

The charging operation may stop as charging completion when the battery voltage of the automated guided vehicle 1 increases to the charging needlessness threshold voltage by executing the CC charging operation. If the charging operation is terminated when the battery voltage increases to the charging needlessness threshold voltage in this manner, it is possible to omit the CV charging operation, which is executed for a predetermined time thereafter, thereby reducing the charging time. Since this method is suitable for the charging operation of the battery LB of the automated guided vehicle 1 that circulates around the travel route R, a battery charging control routine illustrated in FIG. 5 described below shows an example in which the charging operation of the battery LB of the automated guided vehicle 1 is terminated using this charging stop criterion. In addition, the charging needlessness threshold voltage of the battery LB used to start and terminate the charging operation can be changed by the equipment-side control device 2.

The charging operation may stop as charging completion by executing the CC charging operation only for a predetermined time and increasing the battery voltage of the automated guided vehicle 1 to a level corresponding to the charging time. If the charging operation is terminated when the battery voltage increases to the level corresponding to the predetermined charging time, it is possible to reduce the charging time to the predetermined time, so that this method is suitable for the charging operation of the battery LB of the automated guided vehicle 1 that circulates around the travel route R. For this reason, a battery charging control routine illustrated in FIG. 6 described below shows an example in which the charging operation of the battery LB of the automated guided vehicle 1 is terminated using this charging stop criterion. Furthermore, the charging needlessness threshold voltage of the battery LB where the charging operation starts can be changed by the equipment-side control device 2.

As the charging operation of the battery LB is terminated in the charging station CS, the automatic charger 3 determines the charging completion and makes the feeding contactor 23 retreat to cut off connection with the receiving contactor 13 of the automated guided vehicle 1. As the connection between the contactors 13 and 23 is cut off, the automated guided vehicle 1 departs from the charging station CS and travels along the travel route R.

Meanwhile, plural automated guided vehicles 1 described above are operated in series so as to circulate between the picking station PS and the assembly station BS to sequentially supply assembly components required in the assembly station BS. It is required to charge plural automated guided vehicles 1 operated in series in this manner using the automatic charger 3 of the charging station CS whenever the remaining amount of the mounted battery LB becomes equal to or lower than a certain predetermined charging needlessness threshold voltage. For this reason, the automatic charger 3 of the charging station CS is required to receive electric power so as to charge each automated guided vehicle 1 to be periodically charged. As a result, there is a problem in that it is difficult to suppress power consumption during a particular time period because it is necessary to continuously maintain a certain electric power amount at all times without interrupting supply of power to the automatic charger 3 of the charging station CS in order to charge the battery of the automated guided vehicle 1.

The battery charging management system of the automated guided vehicle according to this embodiment has been made to address such a problem and suppress power consumption during a certain time period. The certain time period may be set to, for example, but not particularly limited to, a predetermined time period of 13:00 to 16:00, such as a daytime of a summer season on which power consumption is concentrated.

For this reason, according to this embodiment, the aforementioned problem is addressed by executing an off-peak control in which the charging needlessness threshold voltage of the battery LB of the automated guided vehicle 1 is set to a lower value during a time period on which the power consumption is concentrated (i.e., a peak time period), compared to a normal time period. As a result, it is possible to suppress power consumption during the peak time period by sufficiently using an electric storage capability of the battery LB while suppressing the charging operation of the battery LB from the automatic charger 3.

In order to execute the off-peak control, the equipment-side control device 2 is provided with a selection switch 2A for selecting whether or not the off-peak control of the supplied electric power is to be executed (OFF-PEAK ON or OFF-PEAK OFF) and a setting part 2B capable of setting the off-peak time period. In addition, the equipment-side control device 2 is provided with a setting part 2C for setting a charging needlessness threshold voltage VA of the automated guided vehicle 1 during a normal time period and a charging needlessness threshold voltage VA of the automated guided vehicle 1 for the off-peak control. Such setting values serve as a criterion for determining whether or not the off-peak control is to be executed when the automated guided vehicle 1 arrives at the automatic charger 3 of the charging station CS.

Figure 5:
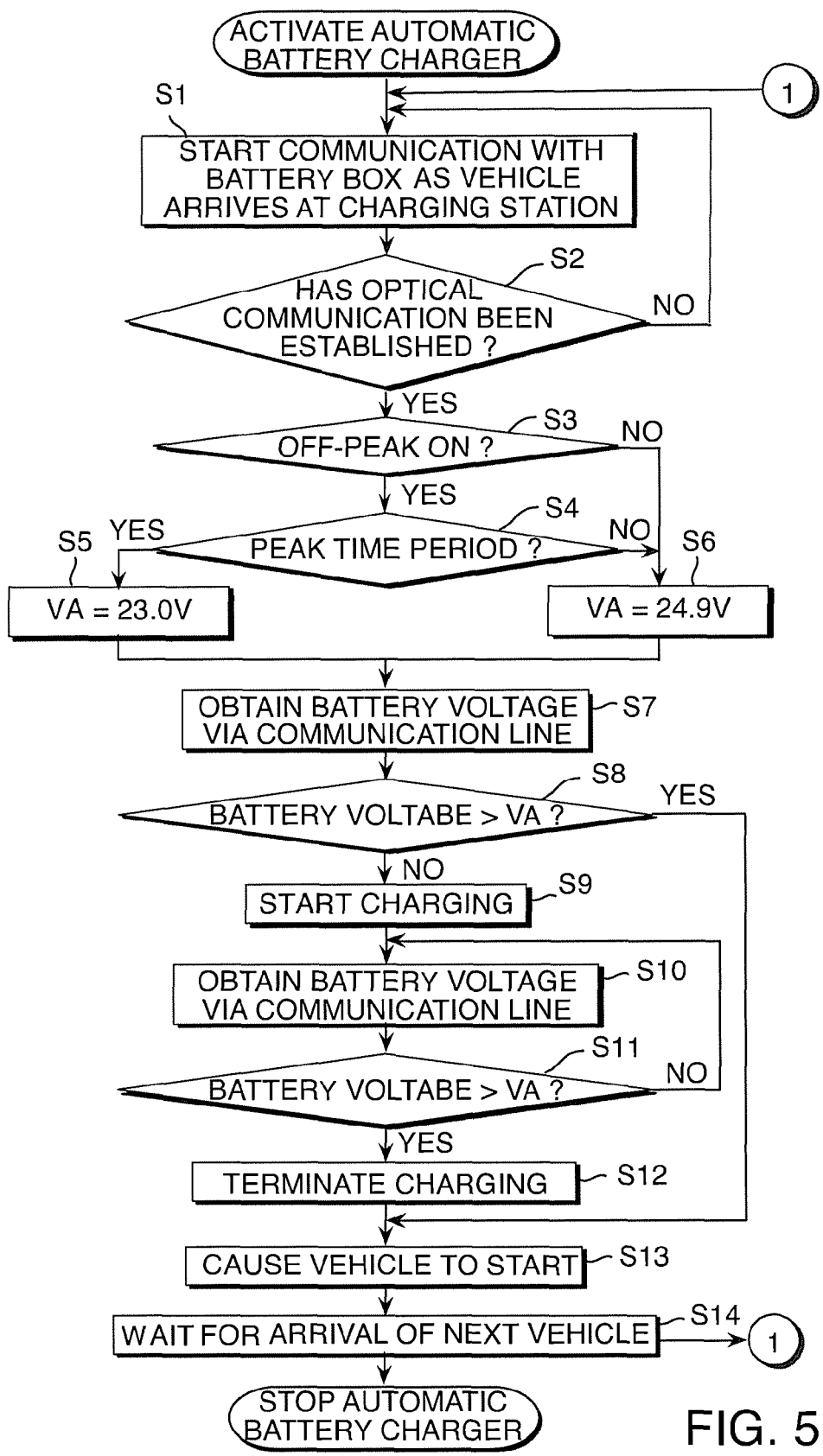
FIG. 5 is a flowchart illustrating a first exemplary battery charging control routine.

According to this embodiment, for the off-peak control, the battery charging control routine of FIG. 5 is executed when the automated guided vehicle 1 arrives at the automatic charger 3 of the charging station CS. Hereinafter, the battery charging management system of the automated guided vehicle 1 according to this embodiment will be described in detail with reference to the battery charging control routine of FIG. 5.

As the automated guided vehicle 1 travels on the travel route R and arrives at the charging station CS, it stops in a predetermined position with respect to the automatic charger 3. The automatic charger 3 starts communication with the communication part 14 of the automated guided vehicle 1 using the communication part 24 (a step S1) and determines whether or not the communication with the automated guided vehicle 1 is established (a step S2).

As the communication is established, it is determined whether or not the power setting of the equipment-side control device 2 is set to the off-peak setting (OFF-PEAK ON) (a step S3). If the power setting is set to the off-peak setting (OFF-PEAK ON), it is determined whether or not the current time corresponds to a peak time period (a step S4). If it is determined that the off-peak setting is set (OFF-PEAK ON), and the current time corresponds to the peak time period, the process advances to a step S5 so that the charging needlessness threshold voltage VA is set to a lower setting voltage (e.g., 23.0 V). If it is determined that the off-peak setting is not set (OFF-PEAK OFF), or the current time does not correspond to the peak time period, the process advances to a step S6, so that the charging needlessness threshold voltage VA is set to a normal setting voltage (e.g., 24.9 V).

Then, the battery voltage of the automated guided vehicle 1 is obtained by communicating with the communication part 14 of the automated guided vehicle 1 (a step S7), and it is determined whether or not this battery voltage exceeds the set charging needlessness threshold voltage VA (a step S8). When the battery voltage is lower than the set charging needlessness threshold voltage VA, the charging operation starts (a step S9).

For the charging operation of the battery LB of the automated guided vehicle, the feeding contactor 23 is connected to the receiving contactor 13 of the automated guided vehicle 1 by extending the feeding contactor 23 from the automatic charger 3 to the automated guided vehicle 1. As the contactors 13 and 23 make contact with each other, a chargeable state is established. The automatic charger 3 activates the DC power supply 21 and supplies the DC power from the DC power supply 21 to the battery LB of the automated guided vehicle 1 through the feeding contactor 23 and the receiving contactor 13 to start the charging operation. In addition, the automatic charger 3 controls the charging current value supplied to the battery LB from the DC power supply 21. The battery voltage increases from the charging start voltage as the charging operation is progressed.

The charge/discharge monitor 11 mounted on the vehicle monitors an increase of the battery voltage. The automatic charger 3 obtains the battery voltage of the automated guided vehicle 1 using the communication parts 14 and 24 (a step S10) and determines whether or not the battery voltage exceeds the set charging needlessness threshold voltage VA (a step S11).

If the battery voltage exceeds the charging needlessness threshold voltage VA, the charging operation is terminated (a step S12). Specifically, the charging operation is interrupted by deactivating the DC power supply 21, and the connection with the receiving contactor 13 of the automated guided vehicle 1 side is released by contracting the feeding contactor 23.

If the battery voltage of the automated guided vehicle 1 exceeds the charging needlessness threshold voltage VA in the step S8, or the battery voltage of the automated guided vehicle 1 exceeds the charging needlessness threshold voltage VA through the processing of the steps S9 to S12, a vehicle departure command is output to the automated guided vehicle 1 using the communication parts 14 and 24 (a step S13).

Then, the charging station CS waits for arrival of the next automated guided vehicle 1 (a step S14→S1). As the next automated guided vehicle 1 arrives, the control sequence (the steps S1 to S13) described above is repeated. It is noted that the automatic charger 3 is deactivated when the assembly production line stops operation.

Figure 6:
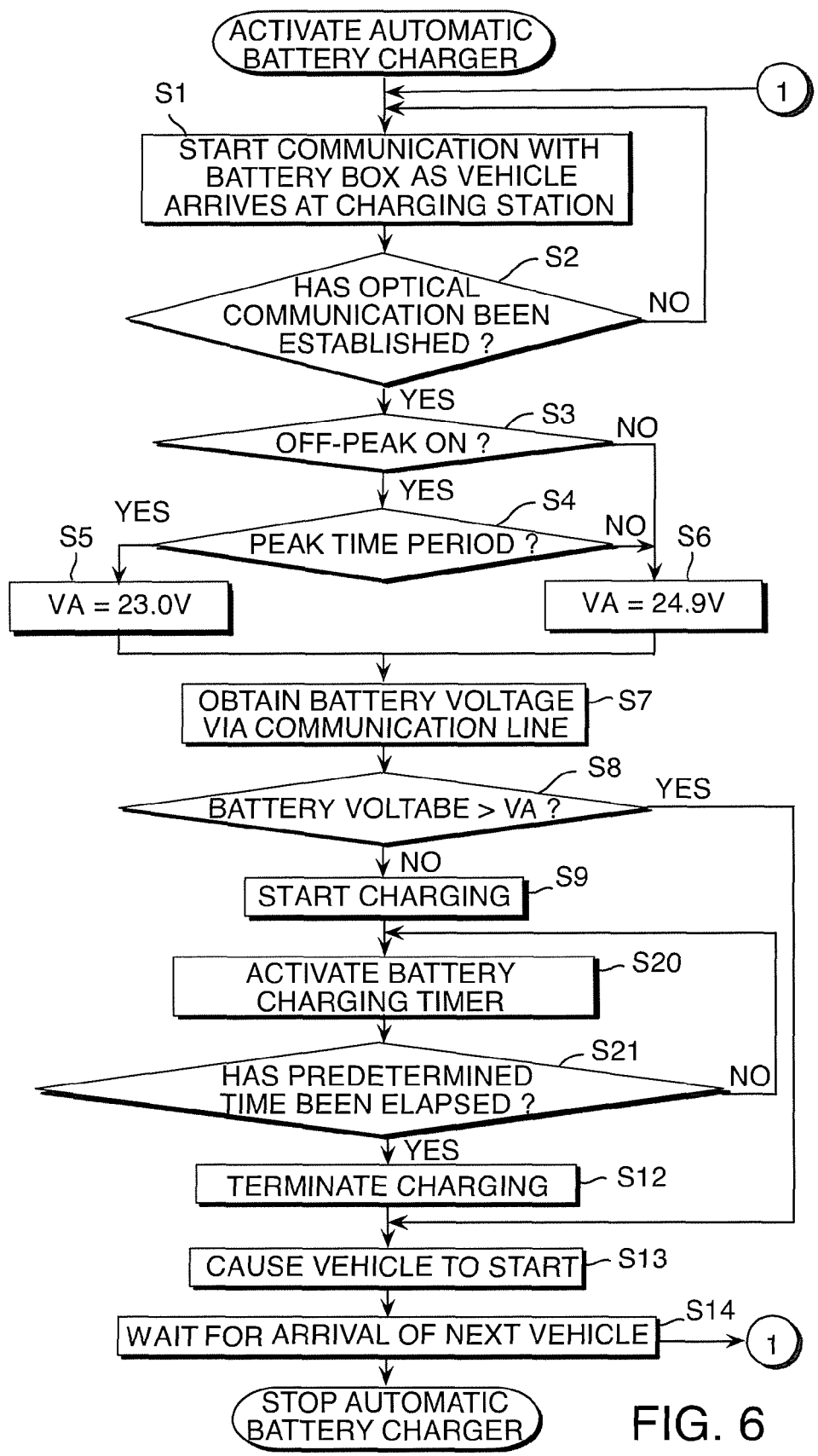
FIG. 6 is a flowchart illustrating a second exemplary battery charging control routine.

A battery charging control routine illustrated in FIG. 6 shows another example in which a part of the processes (the steps S10 and S11) of the battery charging control routine of FIG. 5 are modified to other processes (steps S20 and S21).

That is, in this example, as the charging operation starts in the step S9, a battery charging timer is set in a step S20, and the battery LB of the automated guided vehicle 1 is charged for a predetermined time. Then, if it is determined that the predetermined time set by the battery charging timer elapses (a step S21), the charging operation is terminated (the step S12).

Therefore, in the processing according to the routine of FIG. 6, even when it is determined that the battery voltage is lower than the charging needlessness threshold voltage, and the charging operation is executed, the battery voltage after a predetermined time set by the battery charging timer changes depending on a temperature condition or a charging start voltage. That is, the battery voltage after a predetermined time set by the battery charging timer may exceed the charging needlessness threshold voltage, or the charging operation may be terminated while the battery voltage does not reach the charging needlessness threshold voltage. However, if the battery voltage is charged only for the time set by the battery-charging timer in this manner, it is possible to fix the parking time of the automated guided vehicle 1 in the charging station CS. This method may be preferable as a method of charging the automated guided vehicle 1 traveling on the travel route R of the orbiting track.

Figure 7:
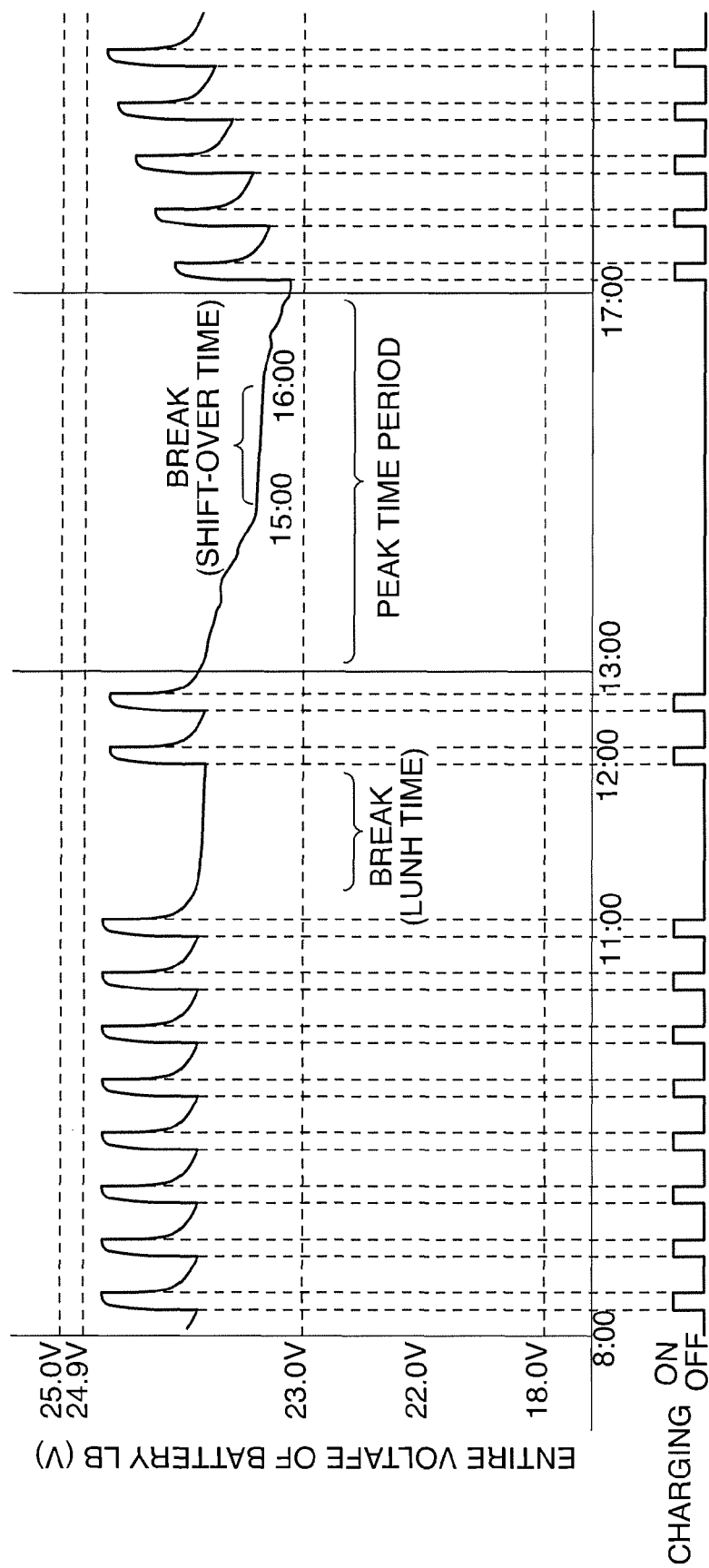
FIG. 7 is a timing chart illustrating a change of the battery voltage in the battery charging control as a result of execution of the second exemplary battery charging control routine.

FIG. 7 shows a change of the battery voltage of the automated guided vehicle 1 according to this embodiment. The abscissa denotes the time elapsing from when the assembly production line starts operation (e.g., 8:00). A time period of 11:00 to 12:00 is set to a lunch break, and a time period of 15:00 to 16:00 is set to a shift-over time for workers, so that the assembly production line and the automated guided vehicles 1 stop. In addition, a time period of 13:00 to 17:00 is set to a peak time period.

The battery voltage of the automated guided vehicle 1 increases as the charging operation is performed in the charging station CS (during CHARGING ON). During CHARGING OFF, the battery voltage decreases as the automated guided vehicle 1 travels using the power supplied from the battery LB. The decrease of the battery voltage stops during the lunch time (11:00 to 12:00) during which the assembly production line and the automated guided vehicles 1 stop.

When the off-peak control is performed, the charging needlessness threshold voltage VA is lowered to 23.0 V. As a result, the automated guided vehicle 1 can continuously travel while the charging operation of the battery LB is not executed even when the automated guided vehicle 1 stops at the charging station CS. In addition, it is possible to reduce the electric power consumed for the charging operation, compared to the normal time period. In this situation also, the charging operation is executed when the battery voltage decreases to a value less than 23.0 V (charging needlessness threshold voltage VA), but the number of the charging operations is reduced.

As the off-peak control is released after 17:00, the charging needlessness threshold voltage VA is changed to 24.9 V. According to this voltage setting, the battery voltage of the automated guided vehicle 1 increase by charging in the charging station CS (CHARGING ON). Thereafter, the battery voltage decreases as the automated guided vehicle 1 travels using the power source of the battery LB.

According to this embodiment, it is possible to obtain the following effects.

(A) This embodiment is directed to a battery charging management system of an automated guided vehicle 1 that travels in an unpiloted manner by using a battery LB as a driving power source and performs a charging operation for the battery LB using an automatic battery charger 3 provided in a charging station CS. The battery charging management system comprises a charge/discharge monitoring part 11 that monitors a charge/discharge amount of the battery LB, and a charging needlessness threshold voltage setting part 2C that sets a charging needlessness threshold voltage for the battery LB. Furthermore, the battery charging management system comprises a charging control part 20 that performs the charging operation for the battery LB using the battery charger 3 when it is determined that a voltage of the battery LB of the automated guided vehicle 1 arriving at the charging station CS is lower than the charging needlessness threshold voltage set by the charging needlessness threshold voltage setting part 2C. The charging needlessness threshold voltage setting part 2C lowers the charging needlessness threshold voltage during a particularly set time period.

That is, since the set charging needlessness threshold voltage is lowered during the particularly set time period, it is possible to suppress the charging operation of the battery LB from the battery charger 3 by sufficiently operating a battery charging capability of the battery LB during a particular time period, thereby suppressing power consumption.

(B) The charge/discharge monitoring part 11 is mounted on the automated guided vehicle 1. The charging needlessness threshold voltage setting part 2C inquires a charge/discharge amount of the battery LB to the charge/discharge monitoring part 11 of the automated guided vehicle 1 arriving at the charging station CS using the communication parts 14 and 24 to obtain the charge/discharge amount of the battery LB. To implement this process, the automated guided vehicle 1 requires only the charge/discharge monitoring part 11 for monitoring the charge/discharge amount of the battery LB mounted on the automated guided vehicle 1. It is therefore possible to lower a cost of the automated guided vehicle 1. Since the assembly production line employs a number of the automated guided vehicles 1, it is also possible to lower a cost of the entire assembly production line.

(C) The charge/discharge monitoring part 11 is configured to monitor voltages of plural cells of the battery LB and stop the automated guided vehicle 1 by displaying an abnormal condition of the battery LB of the automated guided vehicle 1 when any one of the voltages of the cells is lower than a predetermined voltage value. Since the predetermined voltage value for determining the abnormal condition of the battery LB is lowered when the automated guided vehicle 1 travels in an area of the assembly station BS of the assembly production line, compared to a case where the vehicle travels in other areas of the assembly production line, it is possible to suppress an abnormal interruption of the automated guided vehicle 1 while the vehicle passes through the area of the assembly station BS.

Although the invention has been described above with reference to a certain embodiment, the invention is not limited to the embodiment described above. Modifications and variations of the embodiments described above will occur to those skilled in the art, within the scope of the claims.

The contents of Tokugan 2012-171716, with a filing date of Aug. 2, 2012 in Japan, are hereby incorporated by reference.

What is claimed is:

1. A battery charging management system for an automated guided vehicle that travels in an unpiloted manner by using a battery as a driving power source and performs a charging operation for the battery using a battery charger provided in a charging station, comprising
a charge/discharge monitoring part that monitors a charge/discharge amount of the battery;
a charging needlessness threshold voltage setting part that sets a charging needlessness threshold voltage for the battery; and
a charging control part that performs the charging operation for the battery using the battery charger when it is determined that a voltage of the battery of the automated guided vehicle arriving at the charging station is lower than the charging needlessness threshold voltage set by the charging needlessness threshold voltage setting part,
wherein the charging needlessness threshold voltage setting part is configured to lower the charging needlessness threshold voltage during a particularly set time period,
the charge/discharge monitoring part is configured to monitor voltages of plural cells of the battery and stop the automated guided vehicle by displaying an abnormal condition of the battery of the automated guided vehicle when any one of the voltages of the cells is lower than a predetermined voltage value, and
the predetermined voltage value for determining the abnormal condition of the battery is lowered when the automated guided vehicle travels in a predetermined area, compared to a case where the vehicle travels in other areas.

2. The battery charging management system for the automated guided vehicle according to claim 1, wherein the charge/discharge monitoring part is mounted on the automated guided vehicle, and
the charging needlessness threshold voltage setting part is configured to inquire a charge/discharge amount of the battery to the charge/discharge monitoring part of the automated guided vehicle arriving at the charging station using a communication part to obtain the charge/discharge amount of the battery.

3. The battery charging management system for the automated guided vehicle according to claim 1, wherein the predetermined area is an area where stopping of the automated guided vehicle is suppressed.

4. A battery charging management method for an automated guided vehicle that travels in an unpiloted manner by using a battery as a driving power source and performs a charging operation for the battery using a battery charger provided in a charging station, comprising
monitoring a charge/discharge amount of the battery;
setting a charging needlessness threshold voltage for the battery;
charging the battery using the battery charger when it is determined that a voltage of the battery of the automated guided vehicle arriving at the charging station is lower than the charging needlessness threshold voltage; and
lowering the charging needlessness threshold voltage during a particularly set time period,
wherein monitoring the charge/discharge amount of the battery comprises monitoring voltages of plural cells of the battery and the method further comprises stopping the automated guided vehicle by displaying an abnormal condition of the battery of the automated guided vehicle when any one of the voltages of the cells is lower than a predetermined voltage value, and
wherein the predetermined voltage value for determining the abnormal condition of the battery is lowered when the automated guided vehicle travels in a predetermined area, compared to a case where the vehicle travels in other areas.

5. The battery charging management method for the automated guided vehicle according to claim 4, wherein the predetermined area is an area where stopping of the automated guided vehicle is suppressed.

* * * * *